United States Patent
Horiguchi (10) Patent No.: US 6,579,207 B2
(45) Date of Patent: Jun. 17, 2003

(54) HYDRAULIC CONTROL METHOD OF AN AUTOMATIC TRANSMISSION AND APPARATUS THEREOF

(75) Inventor: Masanobu Horiguchi, Atsugi (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/058,287

(22) Filed: Jan. 30, 2002

(65) Prior Publication Data

US 2002/0107109 A1 Aug. 8, 2002

(30) Foreign Application Priority Data

Feb. 6, 2001 (JP) ........................................ 2001-029173

(51) Int. Cl.$^7$ .............................................. F16H 59/64
(52) U.S. Cl. ........................................................ 477/98
(58) Field of Search ............................................. 477/98

(56) References Cited

U.S. PATENT DOCUMENTS

| 4,964,317 | A | * | 10/1990 | Murano et al. ............... 477/34 |
| 4,996,894 | A | * | 3/1991 | Holbrook et al. ............. 477/98 |
| 5,327,800 | A | * | 7/1994 | Van Selous .................. 475/131 |
| 5,906,559 | A | * | 5/1999 | Murasugi et al. ............. 477/93 |
| 5,928,108 | A | * | 7/1999 | Takiguchi .................... 477/98 |

FOREIGN PATENT DOCUMENTS

JP  10-169764  6/1998

* cited by examiner

Primary Examiner—Dirk Wright
(74) Attorney, Agent, or Firm—Foley & Lardner (57) ABSTRACT

A hydraulic pressure is supplied to friction engagement elements in the release state to discharge air in the hydraulic circuit when a delivery amount of a hydraulic pump exceeds a predetermined value and when an oil amount required to be supplied to friction engagement elements in the engagement state is less than a predetermined value. The supply of the hydraulic pressure for discharging the air is suspended when the delivery amount is equal to or less than the predetermined value and when the oil amount required to be supplied is equal to or greater than the predetermined value.

17 Claims, 6 Drawing Sheets

|      | L/C | L&R/B | 2&4/B | H/C | R/C | L/OWC |
|------|-----|-------|-------|-----|-----|-------|
| 1st  | ○   | ●     |       |     |     | △     |
| 2nd  | ○   |       | ○     |     |     |       |
| 3rd  | ○   |       |       | ○   |     |       |
| 4th  |     |       | ○     | ○   |     |       |
| R    |     | ○     |       |     | ○   |       |

○ ENGAGED
● ENGAGED FOR ONE RANGE
△ ENGAGED FOR DRIVE

FIG.4

| GEAR \ SOLENOID | SHIFT SILENOID(A) | SHIFT SILENOID(B) |
|---|---|---|
| 1st | ON  | ON  |
| 2nd | OFF | ON  |
| 3rd | OFF | OFF |
| 4th | ON  | OFF |

HYDRAULIC CONTROL METHOD OF AN AUTOMATIC TRANSMISSION AND APPARATUS THEREOF

FIELD OF THE INVENTION

The present invention relates to a hydraulic control method of an automatic transmission and to an apparatus thereof. More specifically, the invention relates to a hydraulic control for discharging air that has been mixed into a hydraulic circuit.

RELATED ART OF THE INVENTION

There has been known an automatic transmission having a plurality of friction engagement elements that are engaged by the supply of a hydraulic pressure, wherein a hydraulic control is executed to discharge air that has been mixed into a hydraulic circuit by supplying the hydraulic pressure to the friction engagement elements that are to be released based on a request in a gear at that moment, to the extent that the friction engagement elements will not be engaged (see Japanese Unexamined Patent Publication No. 10-169764).

In the above-mentioned hydraulic control for discharging the air, however, the hydraulic pressure is supplied even to the friction engagement elements to which the supply of hydraulic pressure should be suspended based on the request in the gear at that moment. Therefore, the hydraulic pressure that is to be supplied to the friction engagement elements becomes deficient, resulting in a possibility of slipping.

SUMMARY OF THE INVENTION

It is therefore an object of the present invention to provide a hydraulic control method and an apparatus thereof capable of avoiding such a situation where a hydraulic pressure to be supplied to friction engagement elements that are to be engaged becomes deficient due to an air discharge control.

In order to accomplish the above-mentioned object, according to the present invention, it is estimated whether a hydraulic pressure for friction engagement elements in an engagement state becomes deficient when the hydraulic pressure is supplied to friction engagement elements in a release state so as to discharge air in a hydraulic path, and an air discharge control is executed when it is estimated that the hydraulic pressure does not become deficient.

The other objects and features of this invention will become understood from the following description with reference to the accompanying drawings.

DESCRIPTION OF THE PREFERRED EMBODIMENTS

Figure 1:
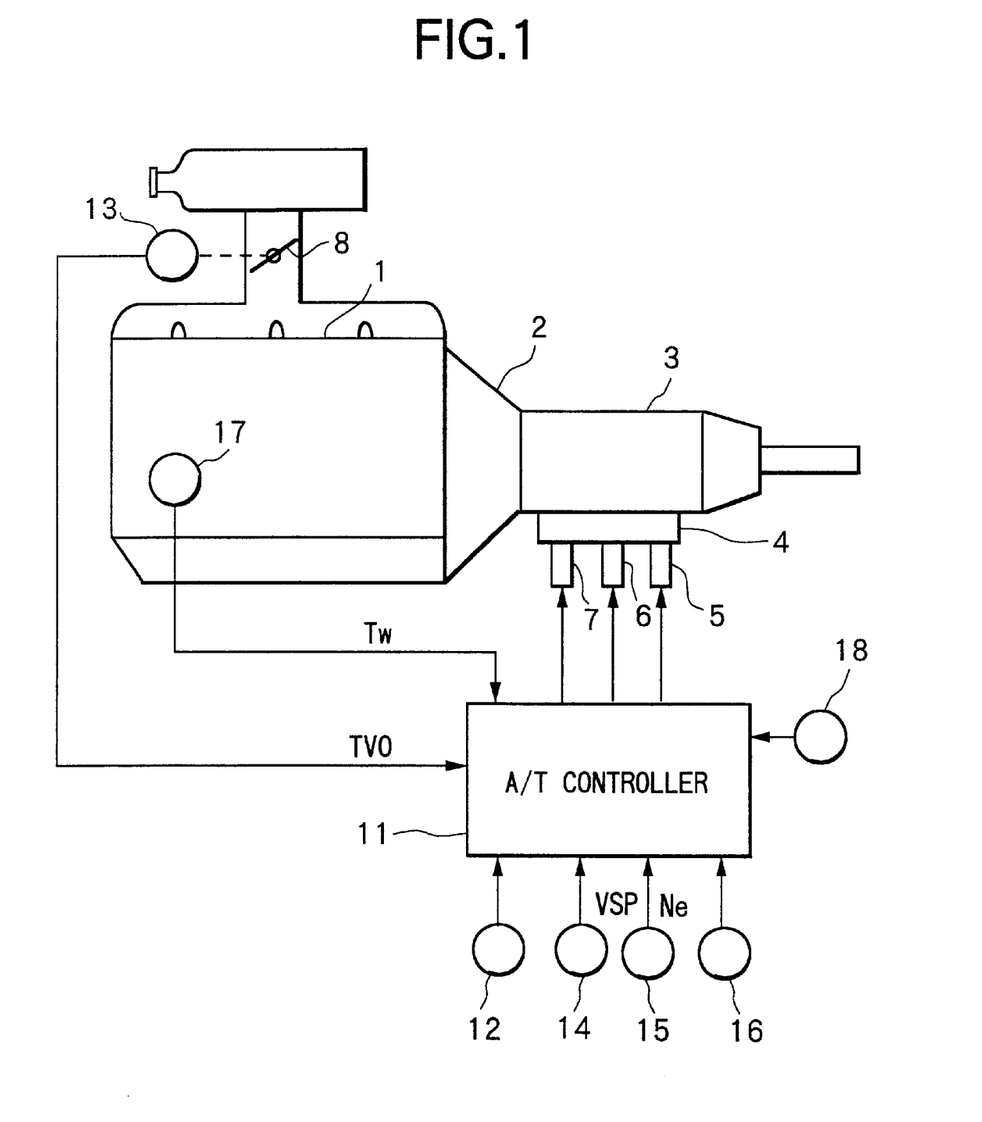
FIG. 1 is a system diagram illustrating a vehicle drive train.

FIG. 1 shows a vehicle drive train.

In this FIG. 1, an output shaft of an engine 1 is connected with an automatic transmission 3 through a torque converter 2 and driving wheels (not shown) of the vehicle are driven for rotation by an output shaft of automatic transmission 3.

Figure 2:
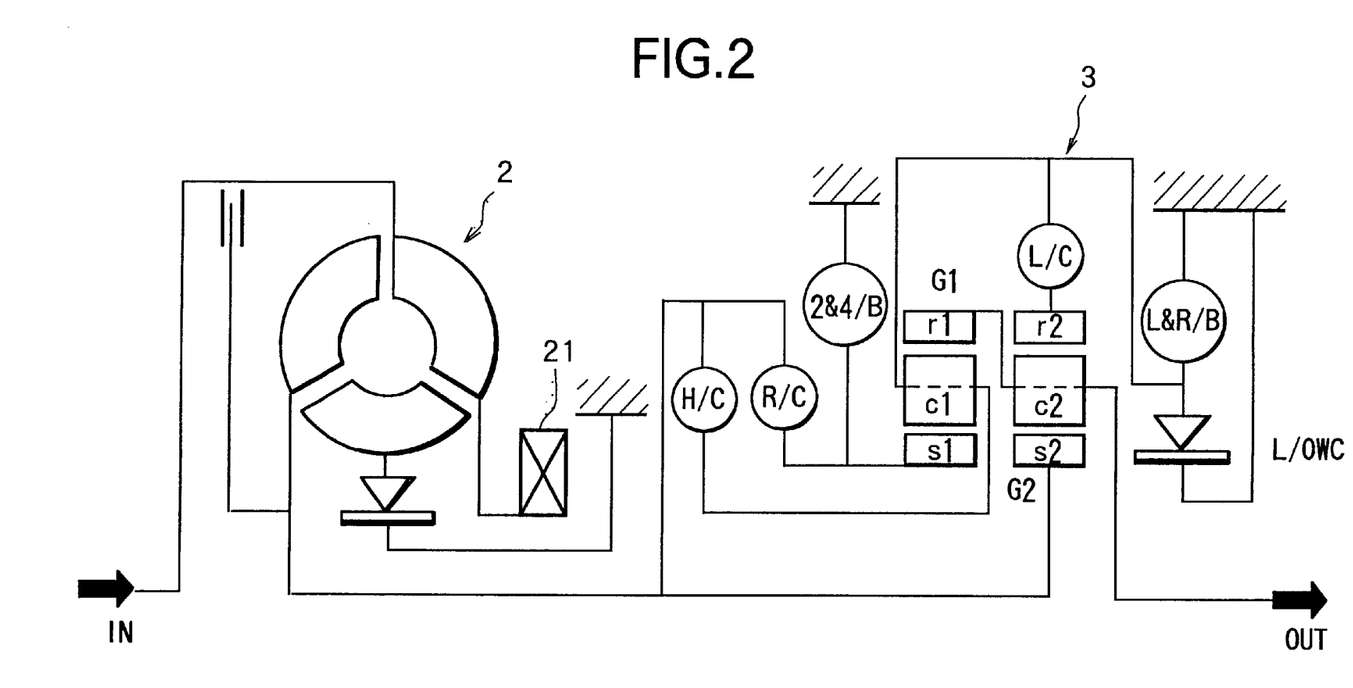
FIG. 2 is a skeleton diagram illustrating a transmission mechanism.

FIG. 2 is a skeleton showing a transmission mechanism portion of automatic transmission 3.

Transmission mechanism portion includes two sets of planetary gears G1, G2, three sets of multiple disc clutches (High Clutch H/C, Reverse Clutch R/C, Low Clutch L/C), a set of brake bands 2 & 4/B, a set of multi plate brakes (low and reverse brake L & R/B), and a set of one-way clutches L/OWC.

The two sets of planetary gears G1, G2 are simple planetary gears comprising sun gears S1, S2, ring gears r1, r2, and carriers c1, c2, respectively.

Sun gear S1 of planetary gear set G1 is constructed to be connectable to an input shaft IN by reverse clutch R/C and at the same time, to be fixable by brake bands 2 & 4/B.

Sun gear S2 of planetary gear set G2 is connected to input shaft IN directly.

Carrier c1 of planetary gear set G1 is constructed to be connectable to input shaft IN by high clutch H/C, while ring gear r2 of planetary gear set G2 is constructed to be connectable to carrier c1 of planetary gear set G1 by low clutch L/C.

Further, carrier c1 of planetary gear set G1 is constructed to be fixable by low and reverse brake L & R/B.

Ring gear r1 of planetary gear set G1 and carrier c2 of planetary gear set G2 are integrally connected to an output shaft OUT.

In FIG. 2, reference numeral 21 denotes a hydraulic pump that is driven by engine 1 to supply an operation fluid to automatic transmission 3.

Figure 3:
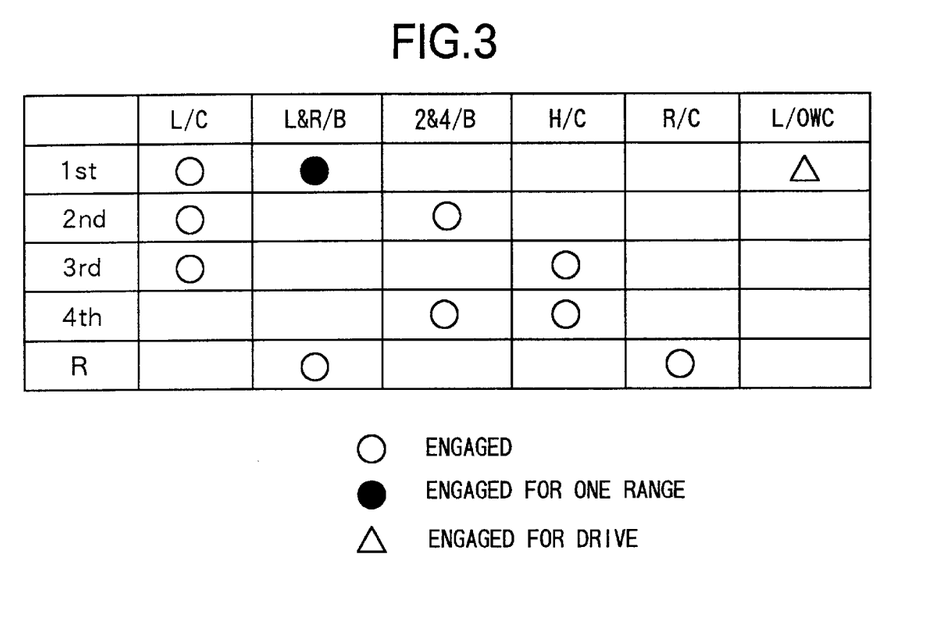
FIG. 3 is a diagram illustrating a correlation between a combination of engagement/release state of the respective friction engagement elements shown in FIG. 2 and each gear.

In the thus constituted transmission mechanism portion, the forward first gear~top (fourth) gear and the reverse gear are realized by the combinations engagement/release states of friction engagement elements as shown in FIG. 3.

In FIG. 3, a circle mark shows an engagement state and a portion with no mark shows a release state.

The engagement state of low & reverse brake L & R/B at first gear shown in a black circle shows the engagement state only in a low range.

Figure 4:
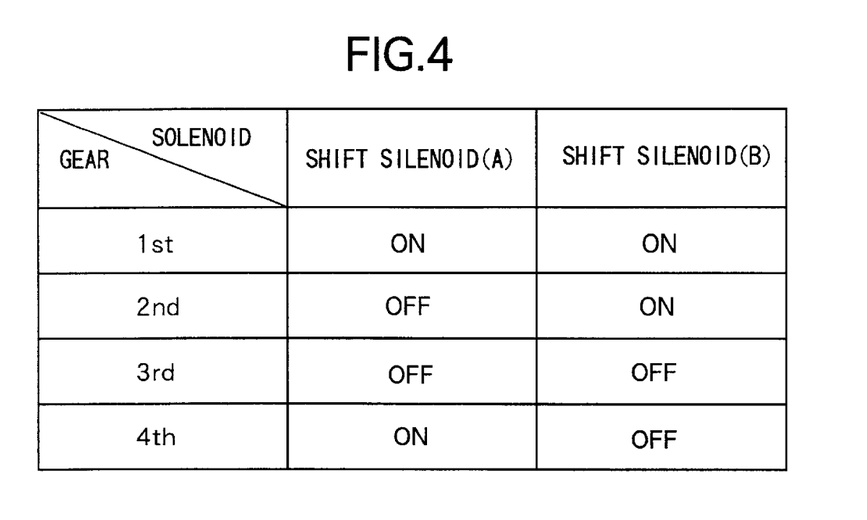
FIG. 4 is a diagram illustrating an ON/OFF combination of shift solenoids A and B in each gear.

Engagement/release of the friction engagement elements is realized by a combination of ON/OFF of a shift solenoid (A) 5 and a shift solenoid (B) 6 inserted into a control valve 4 for gear change control shown in FIG. 1 (see FIG. 4).

Further, a line pressure solenoid 7 is inserted into control valve 4, and a line pressure of control valve 4 is controlled by line pressure solenoid 7.

Shift solenoid (A) 5, shift solenoid (B) 6 and line pressure solenoid 7 are controlled by an A/T controller 11.

A/T controller 11 receives detection signals from an ATF temperature sensor 12 that detects the temperature of automatic transmission fluid (hereinafter referred to as ATF), a throttle angle sensor 13 that detects an opening degree TVO of a throttle valve 8 of engine 1, a vehicle speed sensor 14 that detects a traveling speed VSP of vehicle, an engine rotation sensor 15 that detects a rotation speed Ne of engine 1, an inhibitor switch 16 that detects a range position, a water temperature sensor 17 that detects the cooling water temperature of engine 1, an ambient temperature sensor 18 and the like.

Figure 5:
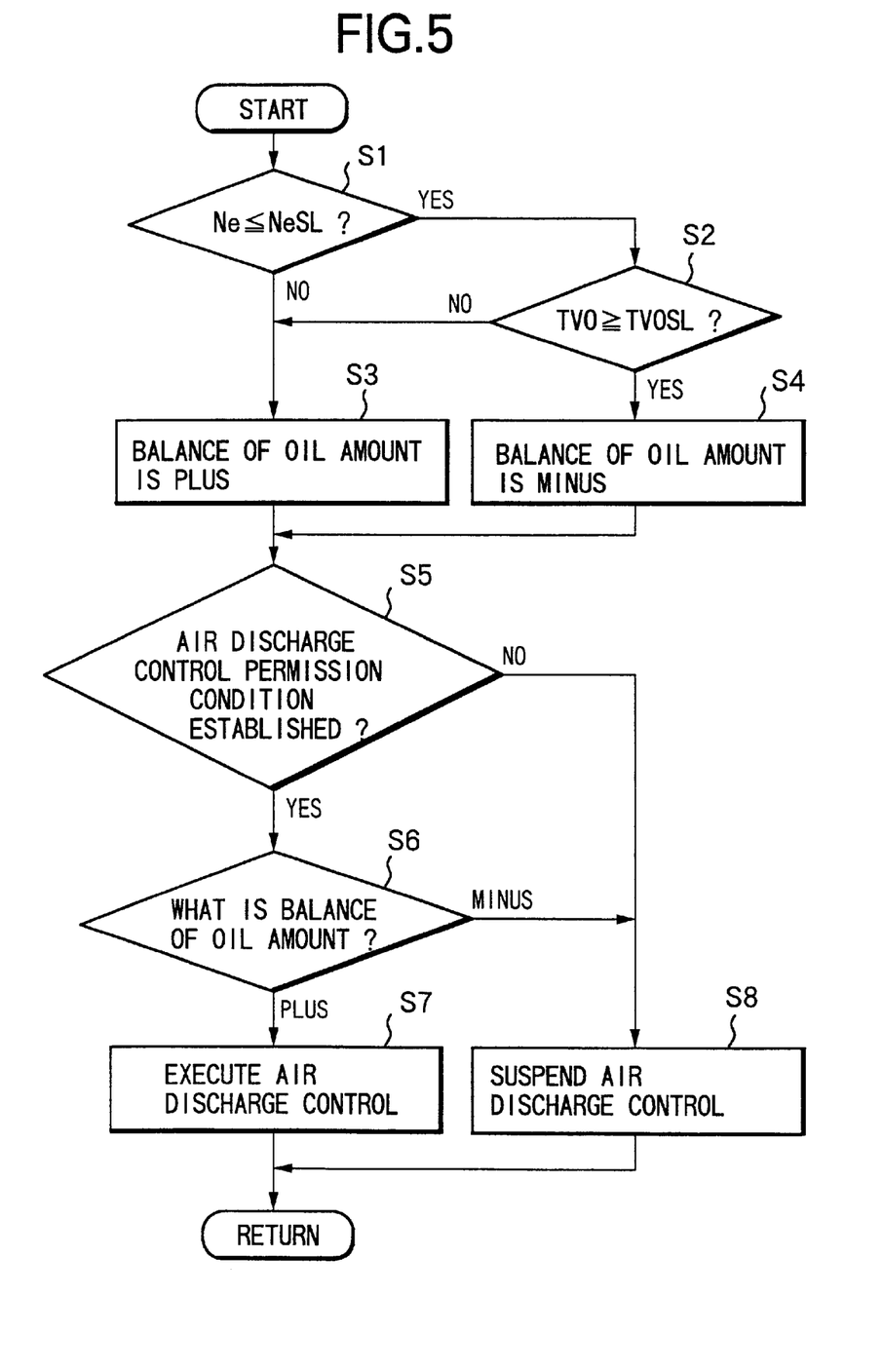
FIG. 5 is a flow chart illustrating an air discharge control according to a first embodiment.

A/T controller 11 performs a normal gear change control based on the above-mentioned various detection signals, and at the same time, executes a control program illustrated in a flow chart of FIG. 5, to perform a control to discharge air that has been mixed into a hydraulic circuit while the vehicle has been left to stand.

The air discharge control will now be described in detail with reference to the flow chart of FIG. 5.

At step S1, it is judged whether the rotation speed Ne of engine 1 is equal to or lower than a predetermined value NeSL.

The predetermined value NeSL has been set in advance as a value within a range of from 1200 to 2000 r.p.m.

In this embodiment, hydraulic pump 21 is driven by engine 1, and a delivery amount thereof is changed depending on the engine rotation speed Ne.

Accordingly, at step S1, it is judged whether the rotation speed Ne of engine 1 is equal to or lower than the predetermined value NeSL to thereby judge whether the delivery amount of hydraulic pump 21 is equal to or less than a predetermined value.

When it is judged at step S1 that the rotation speed Ne of engine 1 exceeds the predetermined value NeSL, i.e., when it is estimated that the delivery amount of hydraulic pump 21 exceeds the predetermined value, the routine proceeds to step S3.

At step S3, it is judged that the balance of oil amount is plus.

"The balance of oil amount is plus" means that an oil amount is sufficient to the extent that the air discharge control can be executed without affecting the hydraulic pressure of the friction engagement elements to be engaged.

On the other hand, when it is judged at step S1 that the rotation speed Ne of engine 1 is equal to or less than the predetermined value NeSL, i.e., when it is estimated that the delivery amount of hydraulic pump 21 is equal to or less than the predetermined value, the routine proceeds to step S2.

At step S2, it is judged whether the throttle opening degree TVO is equal to or greater than a predetermined value TVOSL.

The throttle opening degree TVO is a parameter representing a load of engine 1. Further, a state where the throttle opening degree TVO of engine 1 is equal to or greater than the predetermined value TVOSL represents a state where an input torque of automatic transmission 3 is equal to or greater than a predetermined value.

When the input torque of automatic transmission 3 is equal to or greater than the predetermined value, there is requested an increased torque capacity for the friction engagement elements to be engaged at the gear at that moment in order to transmit the input torque.

To ensure the increased torque capacity, a large amount of oil needs to be supplied to the friction engagement elements.

That is, the state where the throttle opening degree TVO is equal to or greater than the predetermined value TVOSL, represents a state where the oil amount required to be supplied to the friction engagement elements to be engaged at the gear at that moment is equal to or greater than a predetermined value.

Here, it is judged at step S1 that the delivery amount of hydraulic pump 21 is equal to or less than the predetermined value and there is a little margin in the delivery amount. Therefore, when it is judged at step S2 that the oil amount required to be supplied to the friction engagement elements to be engaged at the gear at that moment is equal to or greater than the predetermined value, then, it is judged that there is no margin to supply the hydraulic pressure for discharging the air, to the friction engagement elements to be released essentially.

Therefore, when it is judged at step S2 that the throttle opening degree TVO is equal to or greater than the predetermined value TVOSL, the routine proceeds to step S4 where it is judged that the balance of oil amount is minus.

"The balance of oil amount is minus" means that there is no margin to supply the hydraulic pressure for discharging the air, to the friction engagement elements to be released essentially.

When it is judged at step S2 that the throttle opening degree TVO is smaller than the predetermined value TVOSL, it is judged that the oil amount required to be supplied to the friction engagement elements to be engaged at the gear at that moment is very small and, hence, even though the delivery amount of hydraulic pump 21 is relatively small, the hydraulic pressure for discharging the air can be supplied to the friction engagement elements to be released essentially. Therefore, the routine proceeds to step S3 to judge that the balance of oil amount is plus.

At step S5, it is judged whether conditions for permitting the execution of air discharge control are established in addition to the balance of oil amount.

Here, it is judged that the conditions for permitting the execution of air discharge control are established when a state is immediately after the first switching from the N-range (neutral range) to the D-range (drive range) after an ignition switch is turned ON, and stabilized at first gear without a speed change request.

Here, however, it should be noted that the conditions for permitting the execution of air discharge control are in no way limited to only those described above.

When it is judged at step S5 that the conditions for executing air discharge control are not established, the routine proceeds to step S8 to suspend the air discharge control.

On the other hand, when it is judged at step S5 that the conditions for permitting the execution of air discharge control are established, the routine proceeds to step S6 to judge whether the balance of oil amount is plus or minus.

When it is judged at step S6 that the balance of oil amount is plus, the routine proceeds to step S7 to execute the air discharge control.

When it is judged at step S6 that the balance of oil amount is minus, the routine proceeds to step S8 to suspend the air discharge control.

The state where the balance of oil amount is minus represents a state where there is no margin to supply the hydraulic pressure for discharging the air, to the friction engagement elements to be released essentially, and there is a high possibility that the hydraulic pressure for the friction engagement elements to be engaged at the gear at that moment becomes become deficient, if the hydraulic pressure is supplied for discharging the air.

Therefore, at this time, the air discharge control is suspended to prevent an occurrence of slipping due to the lack of hydraulic pressure in the friction engagement elements to be engaged.

The air discharge control at step S7 is executed by controlling shift solenoid (A) 5 and shift solenoid (B) 6.

To be specific, shift solenoid (A) 5 and shift solenoid (B) 6 are both controlled to be ON at first gear. However, when executing the air discharge control, shift solenoid (A) 5 and shift solenoid (B) 6 are both turned OFF temporarily.

The state where shift solenoid (A) 5 and shift solenoid (B) 6 are both OFF corresponds to third gear state (see FIG. 4) where the low clutch L/C and the high clutch H/C are engaged (see FIG. 3).

At first gear where shift solenoid (A) 5 and shift solenoid (B) 6 are both ON, the high clutch H/C is released and the low clutch L/C is engaged.

By turning both shift solenoid (A) 5 and shift solenoid (B) 6 OFF, therefore, the hydraulic pressure is supplied to the high clutch H/C to be released at first gear, and the air that has been mixed into the hydraulic circuit of the high clutch H/C is discharged by the supply of this hydraulic pressure.

Shift solenoid (A) 5 and shift solenoid (B) 6 are turned OFF continuously within a period of time in which the high clutch H/C is maintained released or are turned OFF for only a very short period of time at every predetermined period.

At step S2, the throttle opening degree TVO is used as the parameter for representing the load of engine 1. However, if the construction is such that there is provided an idling switch which is turned ON at the fully closed position of throttle valve 8, the ON/OFF of the idling switch can be judged at step S2A as shown in a flow chart of FIG. 6.

Figure 6:
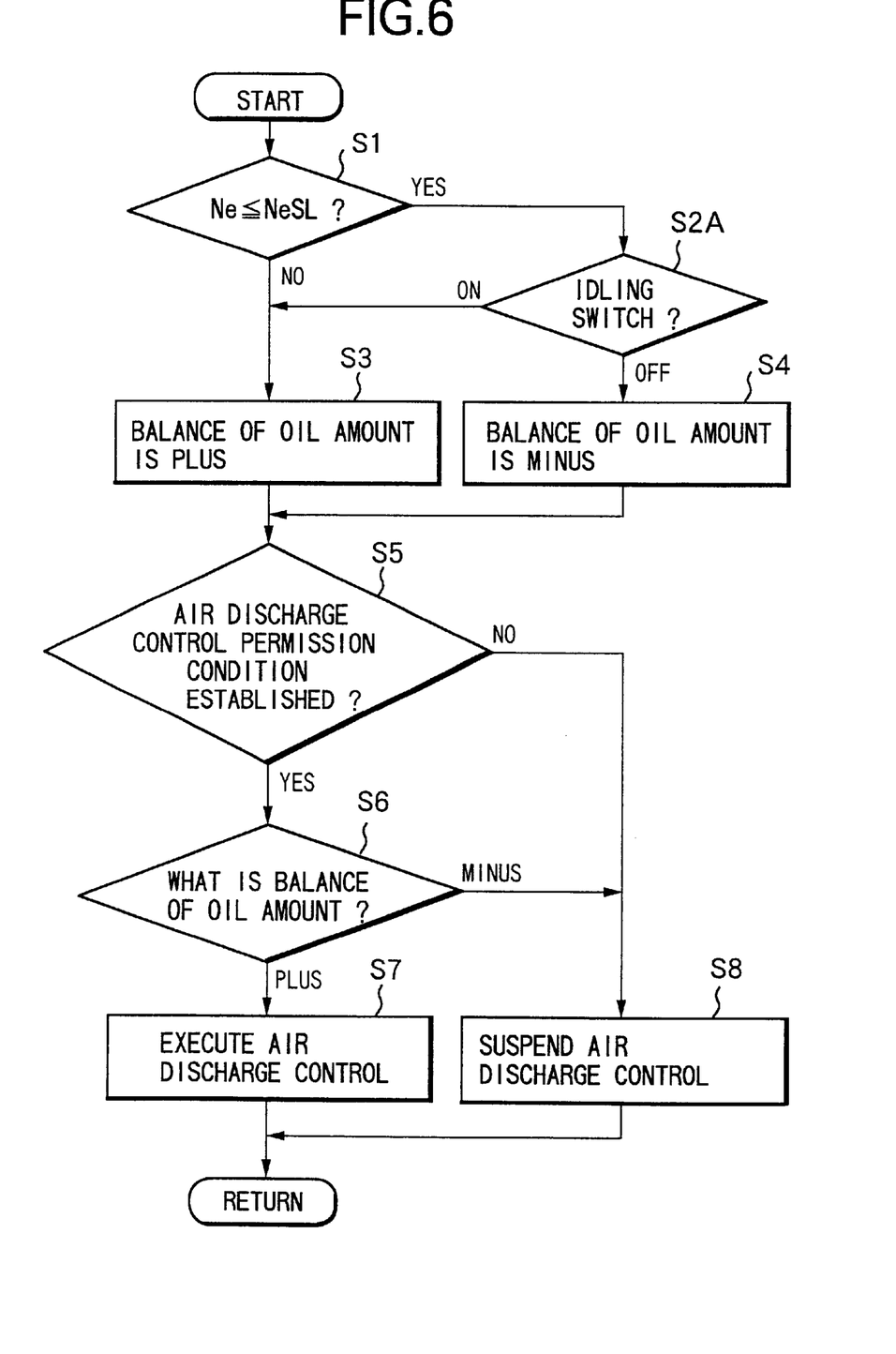
FIG. 6 is a flow chart illustrating the air discharge control according to a second embodiment.

In the flow chart of FIG. 6, the routine proceeds to step S4 when the engine is in a non-idling condition where the idling switch is OFF (throttle valve is opened), while the routine proceeds to step S3 when the engine is in an idling condition where the idling switch is ON (throttle valve is fully closed).

At step S2, further, it is required to judge whether the oil amount required to be supplied to the friction engagement elements to be engaged at the gear at that moment are equal to or greater than the predetermined value. Therefore, in the case of constitution in which the hydraulic pressure for the friction engagement elements is controlled to an indicated hydraulic pressure through the respective valves, the construction may be such that the indicated hydraulic pressure for the friction engagement elements to be engaged at the gear at that moment is judged.

Figure 7:
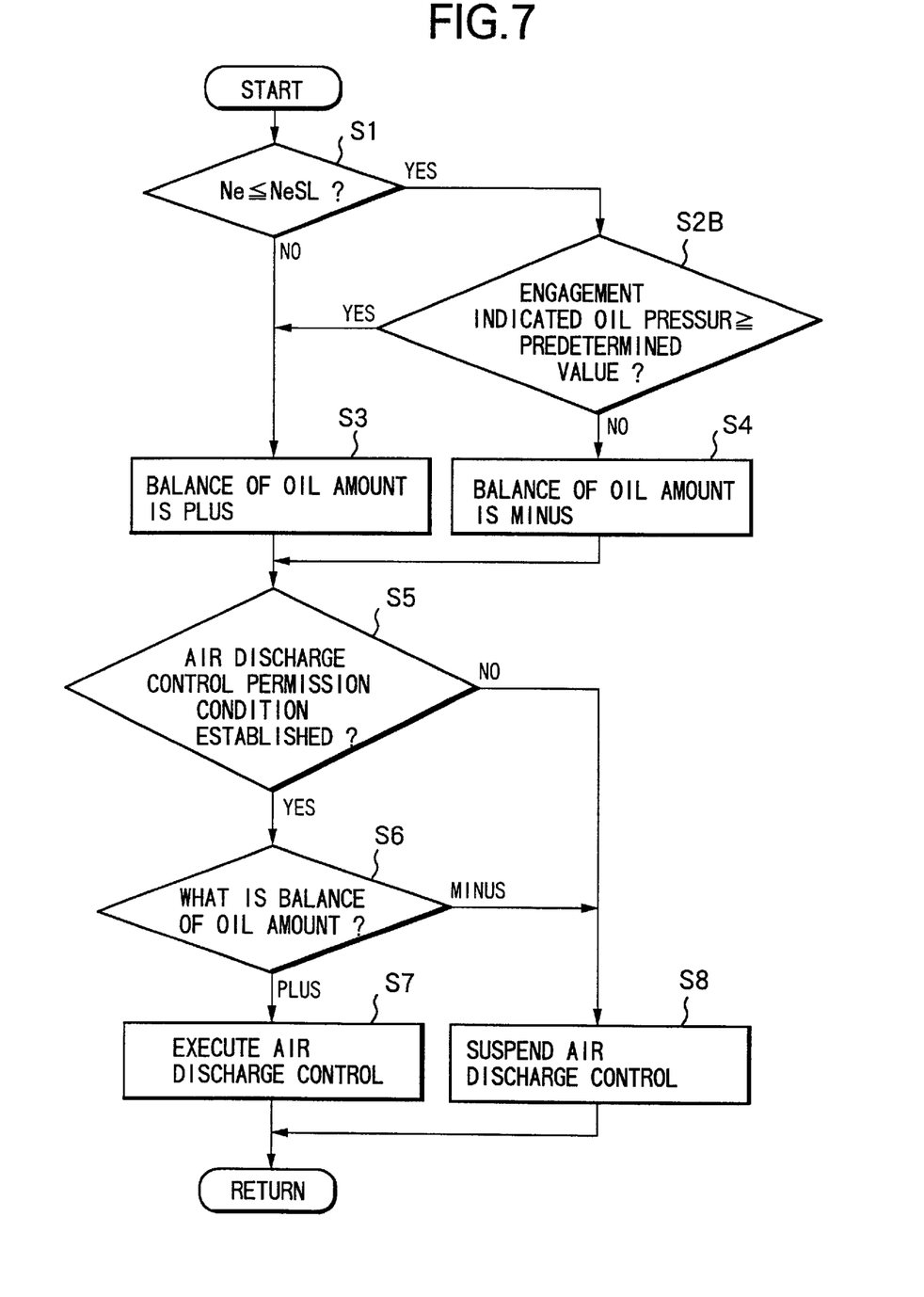
FIG. 7 is a flow chart illustrating the air discharge control according to a third embodiment.

FIG. 7 is a flow chart for judging the indicated hydraulic pressure, in which step S2B judges whether the indicated hydraulic pressure for the friction engagement elements to be engaged at the gear at that moment is equal to or greater than a predetermined value.

When the indicated hydraulic pressure is equal to or greater than the predetermined value, the routine proceeds to step S4 where it is judged that the balance of oil amount is minus. When the indicated hydraulic pressure is less than the predetermined value, the routine proceeds to step S3 where it is judged that the balance of oil amount is plus.

Further, to simplify the construction, the processing at step S2 may be omitted. Namely, when the engine rotation speed Ne is equal to or less than the predetermined value NeSL, the routine proceeds to step S4 to judge that the balance of oil amount is minus. When the engine rotation speed Ne is higher than the predetermined value NeSL, the routine proceeds to step S3 to judge that the balance of oil amount is plus.

The entire contents of Japanese Patent Application No. 2001-029173 filed Feb. 6, 2001 are incorporated herein by reference.

What is claimed is:

1. A hydraulic pressure control method of an automatic transmission provided with a hydraulic pump and a plurality of friction engagement elements that are engaged by the supply of a hydraulic pressure, comprising the operations of:

detecting a supply state of the hydraulic pressure;

estimating, based on said detected supply state of the hydraulic pressure, whether or not the hydraulic pressure for the friction engagement elements in the engagement state becomes deficient, when the hydraulic pressure is supplied to the friction engagement elements in the release state in order to discharge air from a hydraulic path;

supplying the hydraulic pressure to the friction engagement elements in the release state to discharge the air from the hydraulic path, provided that it is estimated that the hydraulic pressure for the friction engagement elements that are in the engagement state does not become deficient; and suspending the supply of the hydraulic pressure for discharging the air when it is estimated that the hydraulic pressure for the friction engagement elements in the engagement state becomes deficient.

2. A hydraulic pressure control method of an automatic transmission according to claim 1, wherein said operation of detecting the supply state of the hydraulic pressure comprises the operation of;

detecting a delivery amount of said hydraulic pump, and said operation of estimating the deficiency of the hydraulic pressure comprises the operations of:

estimating that the hydraulic pressure for the friction engagement elements in the engagement state is not deficient when the delivery amount of said hydraulic pump exceeds a predetermined value; and estimating that the hydraulic pressure for the friction engagement elements in the engagement state is deficient when the delivery amount of said hydraulic pump is equal to or less than the predetermined value.

3. A the hydraulic pressure control method of an automatic transmission according to claim 2, wherein said hydraulic pump is driven by an engine to be combined with said automatic transmission, and said operation of detecting the delivery amount of the hydraulic pump comprises the operation of;

detecting a rotation speed of said engine as a value corresponding to the delivery amount of said hydraulic pump.

4. A hydraulic pressure control method of an automatic transmission according to claim 1, wherein said operation of detecting the supply state of the hydraulic pressure comprises the operations of:

detecting a delivery amount of said hydraulic pump; and detecting an oil amount required to be supplied to the friction engagement elements in the engagement state, and said operation of estimating the deficiency of the hydraulic pressure comprises the operations of:

estimating that the hydraulic pressure for the friction engagement elements in the engagement state is not deficient when said delivery amount exceeds a predetermined value and when said oil amount required to be supplied is less than a predetermined value; and estimating that the hydraulic pressure for the friction engagement elements in the engagement state is deficient when the delivery amount of said hydraulic pump is equal to or less than the predetermined value and when the oil amount required to be supplied to the friction engagement elements in the engagement state is equal to or greater than the predetermined value.

5. A hydraulic pressure control method of an automatic transmission according to claim 4,
wherein said operation of detecting the oil amount required to be supplied comprises the operation of;
detecting an indicated hydraulic pressure for the friction engagement elements in the engagement state as a value corresponding to said oil amount required to be supplied.

6. A hydraulic pressure control method of an automatic transmission according to claim 4,
wherein said operation of detecting the oil amount required to be supplied comprises the operation of;
detecting a torque input to said automatic transmission as a value corresponding to said oil amount required to be supplied.

7. A hydraulic pressure control method of an automatic transmission according to claim 4,
wherein said operation of detecting the oil amount required to be supplied comprises the operation of;
detecting a load of the engine combined with said automatic transmission as a value corresponding to said oil amount required to be supplied.

8. A hydraulic pressure control method of an automatic transmission according to claim 4,
wherein said operation of detecting the oil amount required to be supplied comprises the operation of;
detecting, as a state correlating to said oil amount required to be supplied, whether or not the engine in combination with said automatic transmission is in an idling condition.

9. A hydraulic pressure control apparatus of an automatic transmission provided with a hydraulic pump and a plurality of friction engagement elements that are engaged by the supply of a hydraulic pressure, comprising:
a valve for controlling the supply of the hydraulic pressure to said plurality of friction engagement elements;
a supply state detector that detects a supply state of the hydraulic pressure in said automatic transmission; and
a controller that controls said valve based on a detection result of said supply state detector,
wherein said controller:
estimates, based on said detected supply state of the hydraulic pressure, whether or not the hydraulic pressure for the friction engagement elements in the engagement state becomes deficient, when the hydraulic pressure is supplied to the friction engagement elements in the release state in order to discharge air from a hydraulic path;
supplies the hydraulic pressure to the friction engagement elements in the release state to discharge the air from the hydraulic path, provided that it is estimated that the hydraulic pressure for the friction engagement elements that are in the engagement state does not become deficient; and
suspends the supply of the hydraulic pressure for discharging the air when it is estimated that the hydraulic pressure for the friction engagement elements in the engagement state becomes deficient.

10. A hydraulic pressure control apparatus of an automatic transmission according to claim 9,
wherein said supply state detector;
detects a delivery amount of said hydraulic pump as a value indicating the supply state of the hydraulic pressure in said automatic transmission, and
said controller:
estimates that the hydraulic pressure for the friction engagement elements in the engagement state is not deficient when the delivery amount of said hydraulic pump exceeds a predetermined value; and
estimates that the hydraulic pressure for the friction engagement elements in the engagement state is deficient when the delivery amount of said hydraulic pump is equal to or less than the predetermined value.

11. A the hydraulic pressure control apparatus of an automatic transmission according to claim 10,
wherein said hydraulic pump is driven by an engine to be combined with said automatic transmission, and
said supply state detector;
detects a rotation speed of said engine as a value corresponding to the delivery amount of said hydraulic pump.

12. A hydraulic pressure control apparatus of an automatic transmission according to claim 9,
wherein said supply state detector;
detects a delivery amount of said hydraulic pump, and an oil amount required to be supplied to the friction engagement elements in the engagement state, and
said controller:
estimates that the hydraulic pressure for the friction engagement elements in the engagement state is not deficient when said delivery amount exceeds a predetermined value and when said oil amount required to be supplied is less than a predetermined value; and
estimates that the hydraulic pressure for the friction engagement elements in the engagement state is deficient when the delivery amount of said hydraulic pump is equal to or less than the predetermined value and when the oil amount required to be supplied to the friction engagement elements in the engagement state is equal to or greater than the predetermined value.

13. A hydraulic pressure control apparatus of an automatic transmission according to claim 12,
wherein said supply state detector;
detects an indicated hydraulic pressure for the friction engagement elements in the engagement state as a value corresponding to said oil amount required to be supplied.

14. A hydraulic pressure control apparatus of an automatic transmission according to claim 12,
wherein said supply state detector;
detects a torque input to said automatic transmission as a value corresponding to said oil amount required to be supplied.

15. A hydraulic pressure control apparatus of an automatic transmission according to claim 12,
wherein said supply state detector;
detects a load of the engine combined with said automatic transmission as a value corresponding to said oil amount required to be supplied.

16. A hydraulic pressure control apparatus of an automatic transmission according to claim 12,
wherein said supply state detector;
detects, as a state correlating to said oil amount required to be supplied, whether or not the engine in combination with said automatic transmission is in an idling condition.

17. A hydraulic pressure control apparatus of an automatic transmission provided with a hydraulic pump and a plurality of friction engagement elements that are engaged by the supply of a hydraulic pressure, comprising:

delivery amount detecting means for detecting a delivery amount of said hydraulic pump;

required supply amount detecting means for detecting an oil amount required to be supplied to the friction engagement elements in the engagement state; and     air discharge control means for supplying the hydraulic pressure to the friction engagement elements in the release state to discharge air from a hydraulic circuit when said delivery amount exceeds a predetermined value and when said oil amount required to be supplied is less than a predetermined value, and for suspending the supply of the hydraulic pressure for discharging the air when said delivery amount is equal to or less than the predetermined amount and when said oil amount required to be supplied is equal to or greater than the predetermined value.

\* \* \* \* \*